United States Patent [19]  
Simpson

[11] 4,115,984  
[45] Sep. 26, 1978

[54] ARRANGEMENT FOR INTERCONNECTING A SIDE DELIVERY RAKE AND A BALER

[76] Inventor: Talmadge Whipple Simpson, Rte. 2, Cochran, Ga. 31014

[21] Appl. No.: 748,290

[22] Filed: Dec. 7, 1976

[51] Int. Cl.² ..................... A01D 55/26; B60D 1/14
[52] U.S. Cl. ..................... 56/13.5; 172/314; 172/649; 172/379; 280/411 C; 280/412; 280/467
[58] Field of Search ........... 280/411 R, 411 A, 411 B, 280/411 C, 412, 413, 472, 467, 473, 476 R, 476 A; 172/310, 314, 677, 679, 649, 656; 56/13.5

[56] References Cited  
U.S. PATENT DOCUMENTS

| 1,872,066 | 8/1932 | Erdman | 280/411 C |
| 2,081,083 | 5/1937 | Beebe | 280/476 A X |
| 2,516,646 | 6/1950 | Reiter | 280/411 B X |
| 2,525,917 | 10/1950 | Leighnor | 280/412 |
| 2,780,478 | 2/1957 | Forsyth | 280/411 C |

Primary Examiner—Joseph F. Peters, Jr.  
Assistant Examiner—R. Schrecengost  
Attorney, Agent, or Firm—Cushman, Darby & Cushman

[57] ABSTRACT

A support member is pivotally connected to a baler and projects laterally thereof. A side delivery rake is secured to the projecting end of the support member.

8 Claims, 4 Drawing Figures

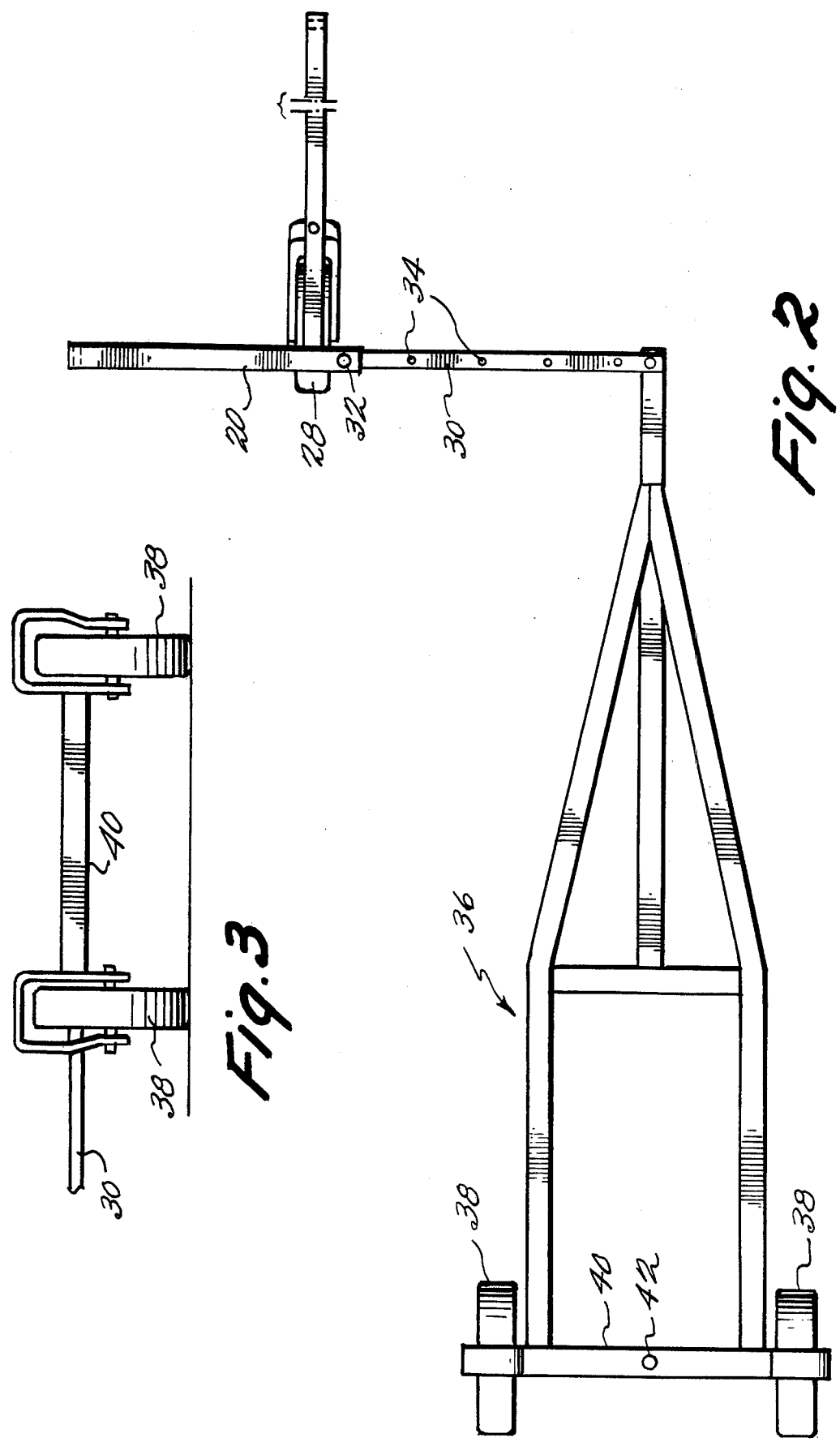

ARRANGEMENT FOR INTERCONNECTING A SIDE DELIVERY RAKE AND A BALER

BACKGROUND OF THE INVENTION

The invention relates to an improvement for use in baling a crop, such as hay or straw, which permits consolidation of separate harvesting steps.

In conventional production of a crop to be baled, e.g., hay, and grass and/or legume is cut and is left on the field to cure. Once this has occurred, a side delivery rake is drawn through the field to form the lying hay into windows, and the windrows are subsequently engaged by a baler. The separate steps of raking and baling require repetitive passes over the field.

A considerable saving in time and operational expense is possible by combining the raking and baling steps. Accordingly, the present invention provides an arrangement whereby a side delivery rake and a baler are operatively interconnected so that while one windrow is being baled, another windrow is being formed in preparation for baling.

SUMMARY OF THE INVENTION

Combined raking and baling is accomplished by attaching a special hitch arrangement to a baler. The hitch extends laterally of the baler so that a side delivery rake secured to the hitch is offset with respect to the baler so as to pass over a different portion of field from that covered by the baler. Consequently, a new windrow is prepared as a previously formed one is being operated upon by the baler.

Details of the invention will become apparent from the following description of embodiments of the invention taken in conjunction with the accompanying drawings wherein:

FIG. 2 is a top plan view of the hitch arrangement used in the embodiment shown in FIG. 1;

FIG. 3 is a rear elevational view of the hitch shown in FIG. 2; and

DETAILED DESCRIPTION OF THE INVENTION

Figure 1:
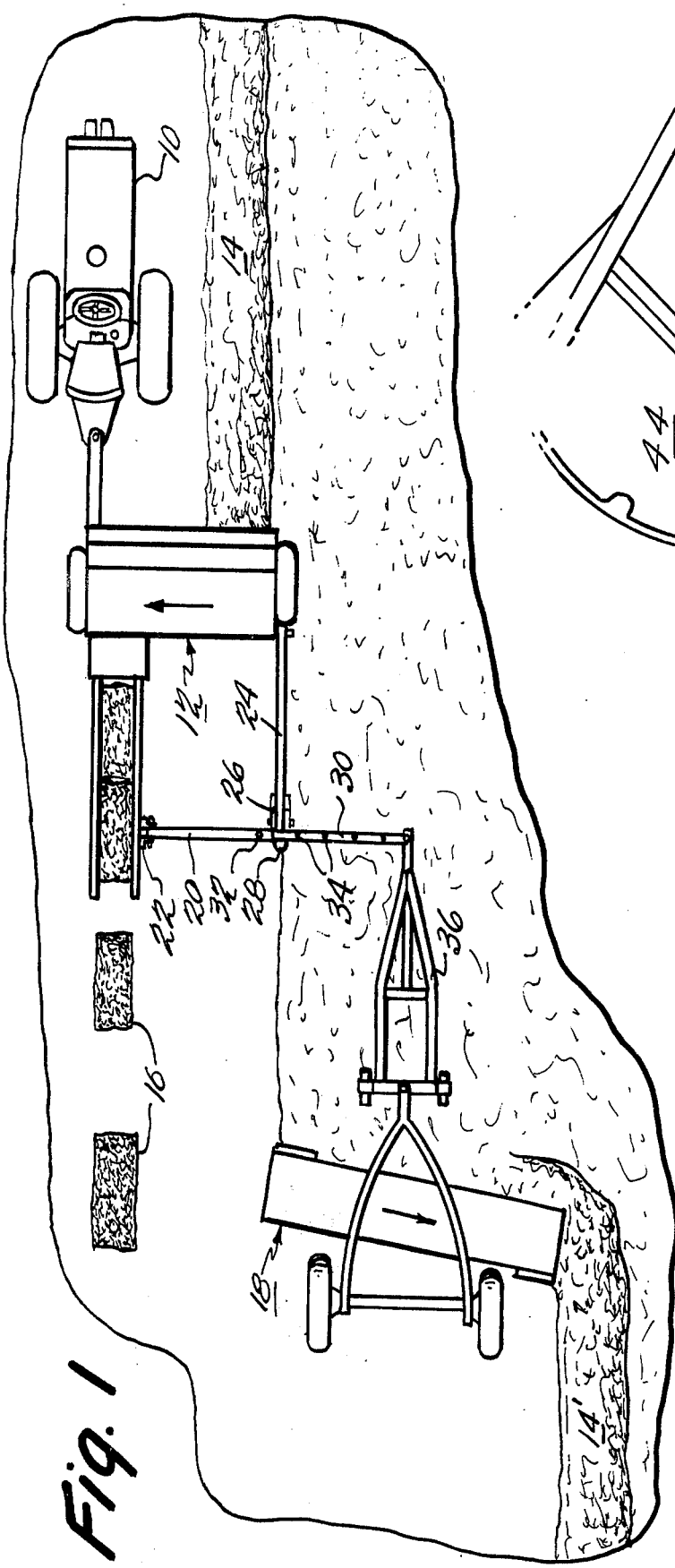
FIG. 1 is a top plan view of a first embodiment of the invention illustrating an interconnected baler and rake being drawn through a field by a tractor.

Referring to FIG. 1, there is illustrated a tractor 10 having joined to its drawbar a conventional baler 12. This type of baler includes a pick-up cylinder which lifts the crop which has been formed in a windrow 14, carries it transversely of the direction of movement of the tractor as indicated by the arrowhead, and discharges the crop in bound bales indicated by the numeral 16. Windrows are obtained by a conventional side delivery rake 18. As the rake 18 travels over the cured crop lying in the field, it displaces it laterally of the direction of the rake's movement, as indicated by the arrowhead, so as to form a windrow.

A hitch is provided to operatively interconnect the baler 12 and the rake 18 so that they may operate simultaneously as they are drawn over the field by the tractor 10. The hitch comprises a first support member 20 which is pivotally mounted to the discharge chamber of the baler, as indicated at numeral 22 in FIG. 1. Member 20 is joined to an additional support member 24 which is pivotally connected at one of its ends to the end of the pick-up cylinder housing of the baler 12. A conventional strut 26 projects downwardly from member 24 to serve as a mount for a ground-engaging wheel 28. The members 20 and 24 are spaced from the ground by wheel 28. Member 20 is provided with a telescoping portion 30. By a suitable hole 32 in member 20, and spaced apertures 34 in portion 30, the latter can be selectively extended from member 20 and held at a given position by a pin (not shown) extending through hole 32 and one of the apertures 34. The outer end of portion 30 is adapted to receive the tongue of a dolly 36. This is accomplished by providing a suitable aperture at the end of portion 30 or by securing a conventional hitch plate thereto. Dolly 36 is a conventional device having a pair of spaced ground-engaging wheels 38 secured to its frame. This frame includes a cross member 40 having a centrally located aperture 42. Cross member 42 is adapted to receive the tongue of rake 18, and joinder between the rake and cross member 40 is achieved in conventional manner by a pin (not shown) which passes through the rake tongue and aperture 42.

By suitably adjusting the length of the telescoping portion 30 with respect to support member 20, the rake 18 can be offset a desired distance from the baler 12, such that the rake, as it passes over the field, operates on a portion of the field not previously raked, or alternatively reforms into a new windrow previously unraked crop material and remnants from the baled windrow. Utilizing the arrangement just described, only one pass of the field is required to perform both a raking and a baling function. The adjustability of the offset of the rake with respect to the baler permits maximum ground coverage by each piece of equipment. Consequently, the crop is harvested rapidly with a minimum involvement of equipment and manpower. The dolly 36 permits turns to be made without contact occurring between the rake and the baler.

While the embodiment of the invention just described relates to a hitch arrangement for joining a conventional baler producing a cube-type bale to a side delivery rake, it should also be appreciated that the concept of joining a rake in offset relationship with a baler also may be employed with conventional balers which form round bales. Such an arrangement is illustrated in FIG. 4, wherein the baler is indicated by numeral 44.

A pair of support members comprising pipes 46 and 48 are pivotally connected to the side of the baler and project outwardly therefrom. These members are joined by a further pipe 50. A hitch plate 52 is secured to the rear of pipe 46 to receive a side delivery rake in the manner previously described. The outer ends of pipes 46 and 50 are held at a prescribed distance above the ground by a chain 54 extending between an eye 56 secured to pipe 50 and an upper portion of the baler 44.

By virtue of the construction of a conventional round baler, it is unnecessary to provide a telescoping arrangement in conjunction with pipe 46 so as to permit substantial lateral displacement of the rake with respect to the baler. Minor adjustments can be obtained by providing additional hitch plates 52 at spaced locations along pipe 46.

Figure 4:
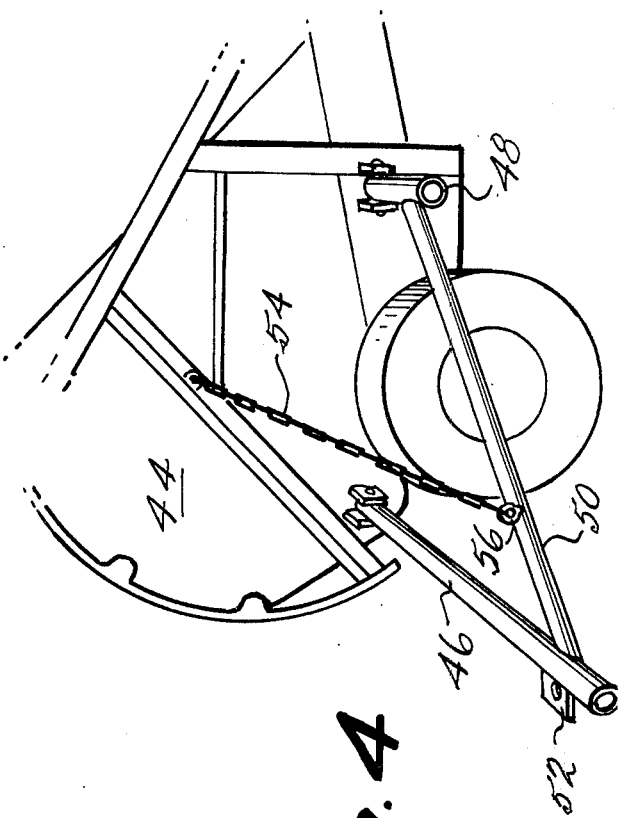
FIG. 4 shows an alternative embodiment of the invention.

The arrangement shown in FIG. 4 is adapted for use with a rake which moves the crop outwardly and to the right (as viewed in the direction of movement of the rake). However, many side delivery rakes are formed so as to move the crop to the left. To accommodate such rakes, the arrangement shown in FIG. 4 is adapted to be disconnected from the baler, inverted, and then pivotally secured to the opposite side of the baler.

While the plate 52 of FIG. 4 is shown as being secured to the pipe 46 in a fixed position, it is apparent that by suitable bolting means the plate 52 may be adjustably secured along the pipe 46 to accomodate rakes of different widths.

What is claimed is:

1. An arrangement for performing simultaneous raking and baling of a crop distributed on a field, comprising:
   a baler adapted to be moved by a tractor over a first strip of said field, said baler including means, laterally displaced from a path traversed by the tractor during such movement, for picking up a windrow of said crop;
   a support member pivotally connected at one of its ends to the baler and projecting laterally of the direction of movement of the baler towards the opposite side of said strip from the tractor path;
   additional support means joined to said baler and said support member for maintaining the member from engaging the ground; and
   a windrow-forming side delivery rake secured to the other end of the support member and movable with the baler to pass over a second strip of said field, at least the major portion of said second strip extending laterally beyond the first strip on the opposite side thereof from said tractor path.

2. An arrangement as set forth in claim 1, wherein said support member includes means for securing the rake at different distances from the baler.

3. An arrangement as set forth in claim 2, wherein said support member includes a telescoping portion.

4. An arrangement as set forth in claim 1, wherein said securing means comprising a wheel-bearing dolly joined to said other end of the support member, said rake being secured to the dolly.

5. An arrangement as set forth in claim 1, wherein said additional support means includes a ground-engaging wheel.

6. An arrangement as set forth in claim 1, wherein said support member and additional support means are adapted to be joined to either side of the baler.

7. An arrangement as set forth in claim 3, wherein said securing means comprises a wheel-bearing dolly joined to said other end of the support member, said rake being secured to the dolly.

8. An arrangement as set forth in claim 7, wherein said additional support means includes a ground-engaging wheel.

* * * * *